Patented Oct. 19, 1954

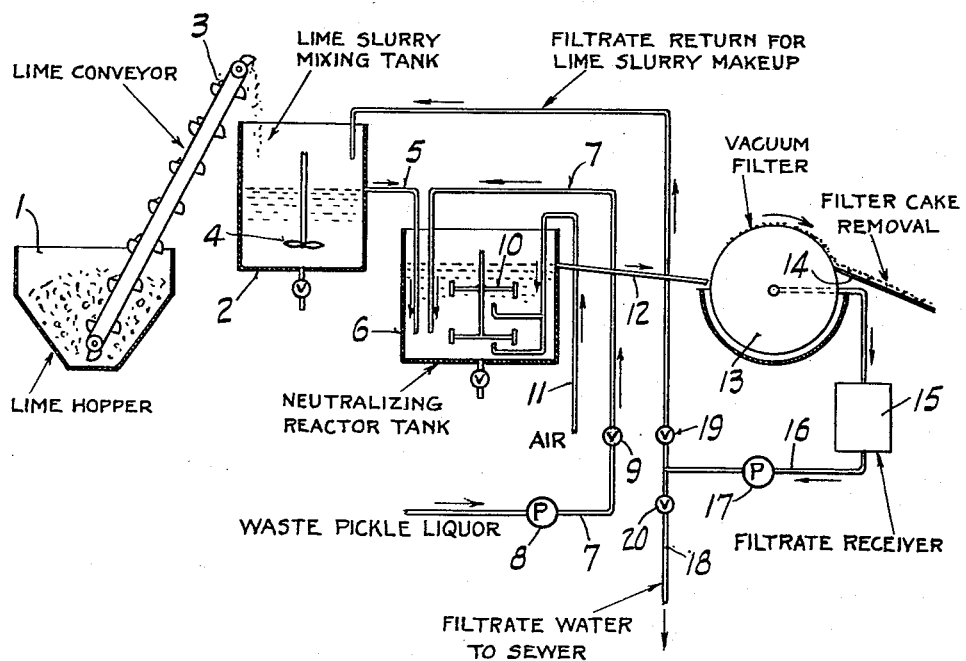

2,692,229

UNITED STATES PATENT OFFICE

2,692,229

DISPOSAL OF WASTE PICKLE LIQUOR

Lorenz William Heise, Milwaukee, and Milton Johnson, Menomonee Falls, Wis., assignors to A. O. Smith Corporation, Milwaukee, Wis., a corporation of New York Application May 5, 1952, Serial No. 286,166

7 Claims. (Cl. 210—2)

This invention relates to a continuous process for the neutralization and disposal of waste pickle liquor.

An object of the present invention is to provide a process for the disposal of pickle liquor which is economical in installation, operation and maintenance.

Another object of the present invention is to provide a continuous process for the disposal of waste pickle liquor which substantially reduces the time required for neutralization and oxidation of the liquor.

Another object of the invention is to provide a method of neutralizing waste pickle liquor using lime produced as a by-product of the carbide process of making acetylene.

Still another object is to provide a disposal process wherein only about 2% to 5% of the ferrous salts in the liquor need be oxidized to achieve maximum filterability.

A further object is to provide a process for the disposal of waste pickle liquor whereby the treated filtrate is employed to make up the neutralizing slurry.

The disposal of waste pickle liquor has been a major plant problem for many years. In the steel industry sulphuric acid is commonly used as a pickling liquor for the removal of iron oxide from iron and steel. The pickling bath is maintained with a concentration of about 5% sulphuric acid by the addition of acid as required until the bath becomes too saturated with salts or laden with dirt and sediment for satisfactory use, at which time the pickling liquor is discarded. At this point the bath may have a concentration of from 20% to 50% $FeSO_4.7H_2O$ and from 2% to 5% sulphuric acid, by weight. In addition the liquor may contain small amounts of metal sulphates, metal sulphides and organic compounds.

Because of the acidic nature of the liquor and the presence of objectionable metal salts it cannot be discharged into streams, sewers or other sanitary systems without prior treatment. It has been the common practice of disposal to first neutralize the liquor and thereafter separate the resulting sludge. A typical disposal process may consist of neutralizing the liquor with slaked lime, limestone or scrap iron, aerating the neutralized liquor for the purpose of oxidizing at least 50% of the iron therein to increase the filterability of the liquor, filtering the insoluble salts from the liquor, and separately removing or dumping of the filter cake and the filtrate. The filtrate being neutral and containing but a small amount of soluble salts may be discharged into the sewage system.

This conventional process of disposal is costly and time consuming. The neutralization of the liquor is done in batches and it ordinarily requires several hours to satisfactorily neutralize and oxidize a batch in order to obtain the required filtering characteristics. As the quantity of pickle liquor to be disposed of by a single plant may run as high as a million gallons per day, using this lengthy batch process requires an enormous amount of storage and neutralizing equipment in order to satisfactorily dispose of the daily accumulation of waste liquor.

The present invention is a continuous, extremely rapid process for the disposal of waste pickling liquor which substantially eliminates all the handling as associated with the conventional batch process and materially decreases the time required for neutralization and oxidization of the liquor, thereby reducing the equipment necessary to handle the large daily volumes of the liquor.

According to the present invention lime produced as a carbide residue is first mixed with water or with the re-circulated treated pickle liquor to form a slurry. The slurry is continually fed into a neutralizing tank into which the pickle liquor is also fed at a rate to give the mixture a pH of about 7.5.

The mixture is agitated to insure complete neutralization of the pickle liquor and aerated to oxidize from about 2% to 5% of the ferrous salts in the liquor so as to give the mixture the proper filtering characterstics. The mixture continually overflows from the neutralizing tank onto a vacuum filter where the same is filtered. The filtered cake containing the insoluble salts is scraped from the filter and conveyed away and dumped. The filtrate is removed to a storage tank and recirculated to the mixing chamber for make-up of the slurry.

By the present invention, make-up of the slurry, neutralization and filtration are continually occurring so that no time or labor is lost in the handling or transporting of the liquor as is necessary in the conventional batch process. In addition a given volume of pickle liquor will be completely treated in about 5 to 15 minutes as compared to the usual 1 to 2 hours for treatment in the former processes. This time saving is brought about through the use of a more effective agitation and neutralization operation and by the fact that only 2% to 5% of the iron need be oxidized rather than the 50% required in the ordinary process.

Other objects and advantages will appear in the course of the following description.

The drawing represents a flow sheet illustrating the present invention.

There is shown in the drawing a continuous process for the disposal of waste pickle liquor which comprises, in general, the following operations: neutralizing the pickle liquor with a lime slurry, partially oxidizing the ferrous salts in the liquor to the ferric state to obtain maximum filterability, filtering the liquor and recirculating the filtrate to make up the lime slurry.

The lime employed to make up the slurry is contained in a hopper 1 and may take the form of slaked lime produced either by the roasting of limestone or as a residual by-product of the carbide process of making acetylene. However it is contemplated that any oxide or hydroxide of an alkaline earth metal may be employed in place of lime as the neutralizing agent.

The lime is conveyed from hopper 1 to a mixing tank 2 by a bucket conveyor 3 or the like.

To begin the process water is mixed with the lime in tank 2 to form an aqueous suspension or slurry of lime. Mixing of the lime and water is accelerated by an agitator 4. After the process is initiated the treated pickle liquor filtrate is employed in place of the water for the purpose of making the slurry.

The lime and water or filtrate are continually added to tank 2 and the resulting lime slurry will therefore continually flow from tank 2 and pass through line 5 to the neutralizing tank 6. The rate at which the lime and filtrate are added to tank 2 determines the rate of flow of the slurry into tank 6.

The waste pickle liquor to be treated passes through line 7 from a storage lagoon into neutralizing tank 6. Line 5 conducting the lime slurry and line 7 conducting the pickle liquor terminate adjacent to each other at the bottom of tank 6 so that the slurry and liquor will tend to mix together at the moment of their entry into the tank.

The pickle liquor is conveyed within line 7 by a suitable pump 8 and the rate of discharge of the liquor from line 7 into tank 6 is controlled by valve 9.

The waste pickle liquor and the lime slurry are thoroughly intermixed in tank 6 by means of a paddle-type agitator 10 so as to insure complete reaction between the ferrous sulphate and/or the sulphuric acid with the lime in accordance with the following equations:

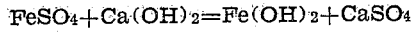

$$FeSO_4 + Ca(OH)_2 = Fe(OH)_2 + CaSO_4$$

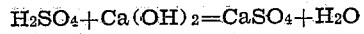

$$H_2SO_4 + Ca(OH)_2 = CaSO_4 + H_2O$$

Under the conditions stated whereby the lime and pickle liquor are introduced in contiguous streams and are constantly mixed by agitator 10 these reactions proceed to substantial completion.

A portion of the ferrous compounds in the liquor are oxidized to the ferric state in the neutralizing tank 6 so as to obtain maximum filterability of the liquor. This oxidation is accomplished by introducing air into tank 6 through line 11. It is preferred to introduce the air beneath the circular path of the rotating paddles of agitator 10 so that the air will be thrown outwardly by the paddles and tend to atomize or disperse in finely divided particles. The atomization causes the air to be distributed equally throughout the entire mass and the effectiveness of oxidation is thereby increased. As shown in the drawing, the agitator 10 is provided with two series of paddles, and the air is introduced beneath each series.

The oxidation is brought about in accordance with the following equation:

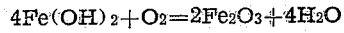

$$4Fe(OH)_2 + O_2 = 2Fe_2O_3 + 4H_2O$$

Previously it was thought that incomplete oxidation of the ferrous compounds resulted in a iron precipitate which was colloidal or gelatinous in nature and very difficult to separate from the solution. Therefore the universal tendency was to oxidize at least 50% to 100% of the ferrous material so as to avoid the poor filterability accompanying any lesser degree of oxidation.

However an important feature of this invention resides in the discovery that excellent filterability can be obtained by merely oxidizing from about 2% to 5% of the ferrous material. The filterability of the precipitate at this percentage of oxidation is equally as good as that obtained at substantially complete oxidation of the ferrous compounds.

This heretofore unknown feature may be determined from a comparison of the filterability of the precipitates with the percentage of ferrous compounds oxidized. The filterability of the liquor is extremely poor when only 0 to 2% ferrous compounds have been oxidized. This means that the iron precipitates at this percentage of oxidation are in a colloidal state which makes them very difficult to separate from the mother liquor.

However as the percentage of oxidized ferrous material is increased, the filterability of the precipitate is increased tremendously until a point of excellent filterability is reached such that the iron precipitates can be readily and completely removed by normal separating processes. This range of excellent filterability lies in the region of about 2% to 5% oxidation of the ferrous compounds.

Further oxidation of the ferrous compounds above 5% results in a sharp decline in filterability and the condition of the iron precipitate is once again gelatinous or colloidal in the region of about 10% oxidation. Filterability at this point is poor.

Continued oxidation of the ferrous material above 10% results in a gradual increase in filterability until a point is reached in the neighborhood of 50% oxidation where the filterability is again excellent and the equivalent of that obtainable in the 2% to 5% range.

It was previously assumed that a satisfactory filterable precipitate could only be attained by oxidizing at least 50% of the ferrous compounds and this degree of oxidation required anywhere from one-half to two hours to perform. By the discovery of the excellent filtering properties in the 2% to 5% oxidation range, the time required by the oxidation was decreased to about 5 to 15 minutes. As the oxidation is the most time consuming operation in the disposal process, it can be seen that this tremendous time saving in oxidation materially decreases the time required for the complete process and means that given apparatus or equipment can dispose of a substantially greater quantity of pickle liquor in a given time. Being able to dispose of the liquor more quickly means of course that the size of the storage tanks or lagoons may be materially decreased. As some plants must dispose of up to a million gallons of pickle liquor a day this time saving brought about by present invention is a most important aid in the disposal.

By reducing the magnitude of oxidation in the present process, the amount of compressed air needed for the oxidation is correspondingly reduced. As the compressed air is an expensive element in a disposal process this feature substantially reduces the operational cost of the present process.

Another factor influencing filterability of the precipitate is the pH. It is necessary to accurately control the pH and maintain the same in the range of about 7.5 to have the least amount of soluble salts in solution. Soluble salts are generally objectionable in the filtrate if the same is to be discharged into the sewage or sanitary system. The pH of the solution may vary between 7.0 and 8.0, but it is essential that the pH not be outside of this range for the amount of soluble salts in solution which cannot be removed by filtration is increased considerable as the pH varies outside of the 7.0 to 8.0 range.

The pH of the solution in tank 6 is controlled by regulating the flow of pickle liquor into the tank by means of valve 9 in line 7 or by regulating the flow of slurry through line 5. The pH control may be performed by manual operation of the necessary valve controls or it may be accomplished automatically by making the flow through lines 5 and 7 responsive to the readings of a pH meter or measuring device.

The liquor properly oxidized and having the required pH overflows from tank 6 and passes through line 12 to a suitable filter 13 or separator. As shown, the filter 13 may be a vacuum disc or drum-type filter.

The insoluble salts containing substantially all of the iron in the original pickle liquor are deposited on filter 13 as a filter cake and removed therefrom by scraper 14. The filter cake is conveyed to a suitable dumping ground or it may undergo subsequent processing to recover valuable ingredients.

The filtrate, which consists essentially of a saturated solution of calcium sulphate, passes from filter 13 to a vacuum filtrate receiver 15. The filtrate may then either be recirculated through line 16 by pump 17 to the mixing tank 2 to be employed to make this lime slurry or it may be discharged from line 16 through 18 to the sewerage system. The rate of flow of the filtrate through line 16 to the mixing tank 2 is controlled by valve 19 and the flow to the sewerage system is regulated by valve 20.

The recirculation of the filtrate is desirable for it eliminates the expense of using fresh water to make up the slurry, and the filtrate also serves as a source of calcium for the slurry. This latter advantage reduces the amount of lime necessary to neutralize a given volume of pickle liquor.

A typical illustration of the process as it has been employed by applicants is as follows: To begin the process the lime, as CaO, and water were added to the slurry mixing tank in the porportions of 1.5 pounds of CaO to 1 gallon of water. This mixture was agitated until a slurry was formed. The slurry was at a temperature of 85° F.

The pickle liquor, having a concentration of 2% $H_2SO_4$ and 20% $FeSO_4$ and at a temperature of 80° F., was added to the neutralizing tank 6 along with the slurry with the flow of the pickle liquor being regulated by a pH measuring device to maintain the pH of the mixture at 7.5. To maintain this pH, a proportion of 7.71 pounds of slurry to 1 gallon of pickle liquor was required.

The mixture, under atmospheric pressure and at a temperature of 106° F. due to the heat of reaction, was agitated within neutralizing tank 6 and subjected to the flow of air at a pressure of 100 p. s. i. for a period of 10 minutes to bring about an oxidation of 3% of the ferrous compounds to the ferric state.

The oxidized liquor continually overflowed from tank 6 and passed onto an Eimco disc filter drawing a vacuum of 20″ of mercury. The filter had a surface area of 400 square feet and revolved at a speed of .75 R. P. M.

The liquor was filtered at the rate of 45 pounds of dry solids per square foot per hour and the discharged cake has a moisture content of approximately 60%. The filtrate consisted of a saturated solution of $CaSO_4$ and was returned to the slurry mixing tank for make-up of the slurry.

It has been found that with the use of the present invention the lime residue from the carbide process of making acetylene can be employed as the neutralizing agent as well as a more pure form of lime, such as that produced by the roasting of limestone. Heretofore it was thought that the carbide lime residue was totally ineffective as a neutralizer because it contained varying amounts of calcium carbonate and other impurities. However the carbide residue lime can be effectively employed in the present process due to a combination of factors, among which are the novel agitation and the recirculation of the calcium fortified filtrate water. The use of the carbide residue lime creates a vast momentary saving for the residual lime is of nominal cost while the purer limes are definitely more expensive. This factor alone may mean the difference between economic practicality and non-practicality of the process.

The present process is designed to be continuous. There are no handling or transporting operations involved for the slurry is continually mixed in tank 2 and overflows to neutralizing tank 6. The properly neutralized and oxidized liquor constantly overflows from tank 6 onto filter 13 and the filtrate water is continually recirculated through line 16 to tank 2 to make up the slurry.

Various embodiments of the invention may be employed within the scope of the following claims.

We claim:

1. A process of treating waste pickle liquor containing sulphuric acid and iron salts comprising, mixing with said liquor an alkaline earth metal oxide to substantially entirely neutralize the liquor and to precipitate said iron salts, oxidizing from about 2% to about 5% of the ferrous constituents in the precipitate to the ferric state to increase the filterability of the precipitate, and filtering the precipitate from the solution.

2. A process of treating waste pickle liquor containing sulphuric acid and iron salts comprising, mixing with said liquor an aqueous suspension of lime to bring the pH of the mixture to about 7.5 and to precipitate the iron salts, oxidizing from about 2% to 5% of the ferrous compounds in said mixture to the ferric state to increase the filterability of the precipitate in said mixture, filtering the precipitate, and recirculating the filtrate to make up the aqueous suspension of lime.

3. A process for treating waste sulphuric acid pickle liquor comprising, mixing the pickle liquor with a lime slurry to neutralize the liquor and to bring the pH of the mixture to about 7.5, oxidizing more than 2% and less than 5% of the ferrous compounds in said mixture to the ferric state to obtain a filterability of the precipitates of said mixture substantially equal to that obtainable at substantially complete oxidation of said ferrous compounds, separating the precipitate in said mixture from the liquid, and recirculating said liquid to make up the slurry.

4. A process of treating waste pickle liquor containing an acid and iron salts comprising, continually and independently introducing the pickle liquor and an aqueous suspension of calcium hydroxide into a neutralizing vessel in adjacent streams, agitating the resulting mixture to substantially completely neutralize the liquor and precipitate the iron salts therein, introducing air into said mixture to oxidize from about 2% to about 5% of the ferrous compounds in said mixture to obtain filterability of the precipitated salts in said mixture substantially equal to filterability obtainable at substantially complete oxidation of said ferrous compounds, said air being dispersed in fine particles to increase the effectiveness of oxidation, continually removing the neutralized and oxidized mixture from said neutralizing chamber, continually separating the precipitated salts in said mixture from the remaining liquid, and recirculating the remaining liquod to make up the aqueous suspension of calcium hydroxide.

5. A process of treating waste pickle liquor containing sulphuric acid and iron salts comprising, continually and independently introducing the pickle liquor and an aqueous suspension of calcium hydroxide into a neutralizing vessel in adjacent streams, agitating the resulting mixture to promote substantially complete neutralization of the liquor and precipitation of the iron salts therein, introducing air into said mixture at a zone adjacent the agitation thereof to oxidize more than 2% and less than 5% of the ferrous compounds in said mixture, continually removing the neutralized and oxidized mixture from said neutralizing chamber, continually separating the precipitated salts in said mixture from the remaining liquid, and recirculating the remaining liquid to make up the aqueous suspension of calcium hydroxide.

6. A continuous process of treating waste pickle liquor containing sulphuric acid and iron salts comprising, mixing with said liquor an aqueous suspension of lime to bring the pH thereof between 7.0 and 8.0 and to precipitate the iron and other insoluble salts therefrom, and leave a solution consisting essentially of soluble calcium salts, oxidizing from about 2% to 5% of the ferrous compounds in the precipitate to the ferric state to increase the filterability of the precipitate, separating the precipitated salts from the solution, and recirculating the solution to make up the aqueous suspension of lime with the solution serving to increase the calcium concentration of said suspension.

7. A process of treating waste pickle liquor containing an acid and iron salts comprising mixing with said liquor a quantity of lime to bring the pH of the liquor to about 7.5 and to precipitate the iron salts therefrom, oxidizing from about 2% to about 5% of the ferrous compounds in the precipitate to the ferric state, and separating the precipitate from the remaining liquor.

References Cited in the file of this patent

UNITED STATES PATENTS

| Number | Name | Date |
|---|---|---|
| 1,672,584 | Travers | June 5, 1928 |
| 1,793,342 | Travers | Feb. 17, 1931 |
| 1,824,936 | Travers | Sept. 29, 1931 |